Aug. 19, 1924.  
C. H. BUTLER  
1,505,371  
TRACTOR TRANSMISSION MECHANISM  
Filed May 3, 1922  
4 Sheets-Sheet 2

Inventor  
CHARLES H. BUTLER  
By Townsend and Loftus  
Attys

Aug. 19, 1924.

C. H. BUTLER 1,505,371

TRACTOR TRANSMISSION MECHANISM

Filed May 3, 1922

Inventor
CHARLES H. BUTLER.

Aug. 19, 1924.

C. H. BUTLER 1,505,371

TRACTOR TRANSMISSION MECHANISM

Filed May 3, 1922

Inventor
CHARLES H. BUTLER

Patented Aug. 19, 1924.

1,505,371

UNITED STATES PATENT OFFICE.

CHARLES H. BUTLER, OF OAKLAND, CALIFORNIA.

TRACTOR TRANSMISSION MECHANISM.

Application filed May 3, 1922. Serial No. 558,050.

*To all whom it may concern:*

Be it known that I, CHARLES H. BUTLER, a citizen of the United States, residing at Oakland, county of Alameda, and State of California, have invented new and useful Improvements in Tractor Transmission Mechanism, of which the following is a specification.

This invention relates to tractors, and has for its object to produce a tractor of simple and economical construction and one capable of easy control and having a small turning radius.

In the design of this tractor I have sought to reduce the cost of the same to a point comparable with the cost of the present so-called walking tractors, and at the same time provide for sufficient power and ruggedness that the tractor will serve all the purposes of the higher priced light tractors. I make use of standard parts throughout and so arrange and combine them in order that machine work will be reduced to a minimum. The tractor drives and steers through its traction wheels, there being a caster wheel at one end of the frame instead of the usual steering wheels. To further reduce the cost of construction I prefer to omit change speed transmission mechanism, using, instead, a novel and simplified transmission mechanism affording one forward and one reverse speed. The drive to each traction wheel is independently controlled so that either wheel may be run forwardly, reversely or stopped entirely independent of the other wheel.

One form which my invention may assume is exemplified in the following description and illustrated in the accompanying drawings, in which—

Figure 1:
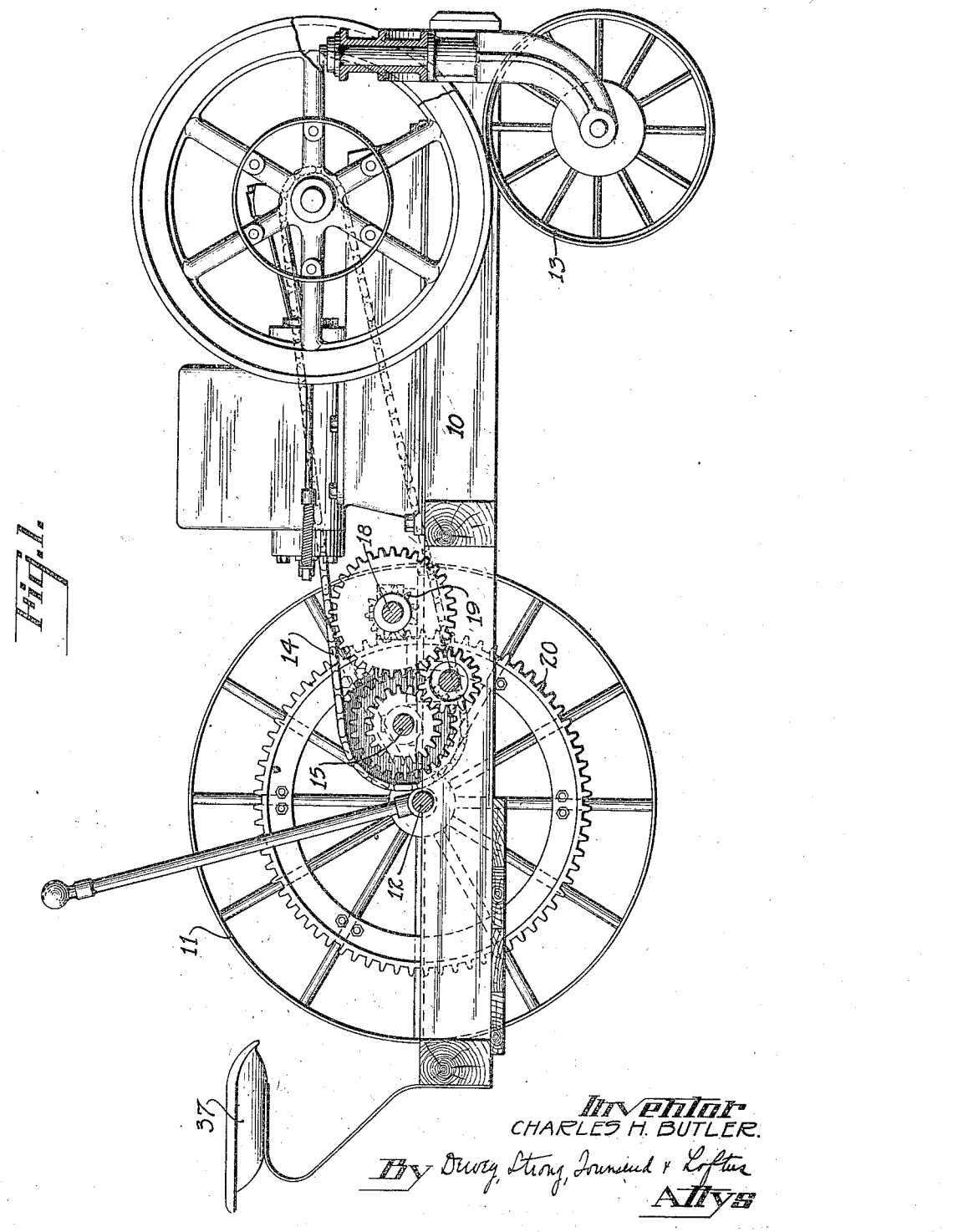
Fig. 1 shows a side elevation of a tractor embodying my invention.
Figure 2:
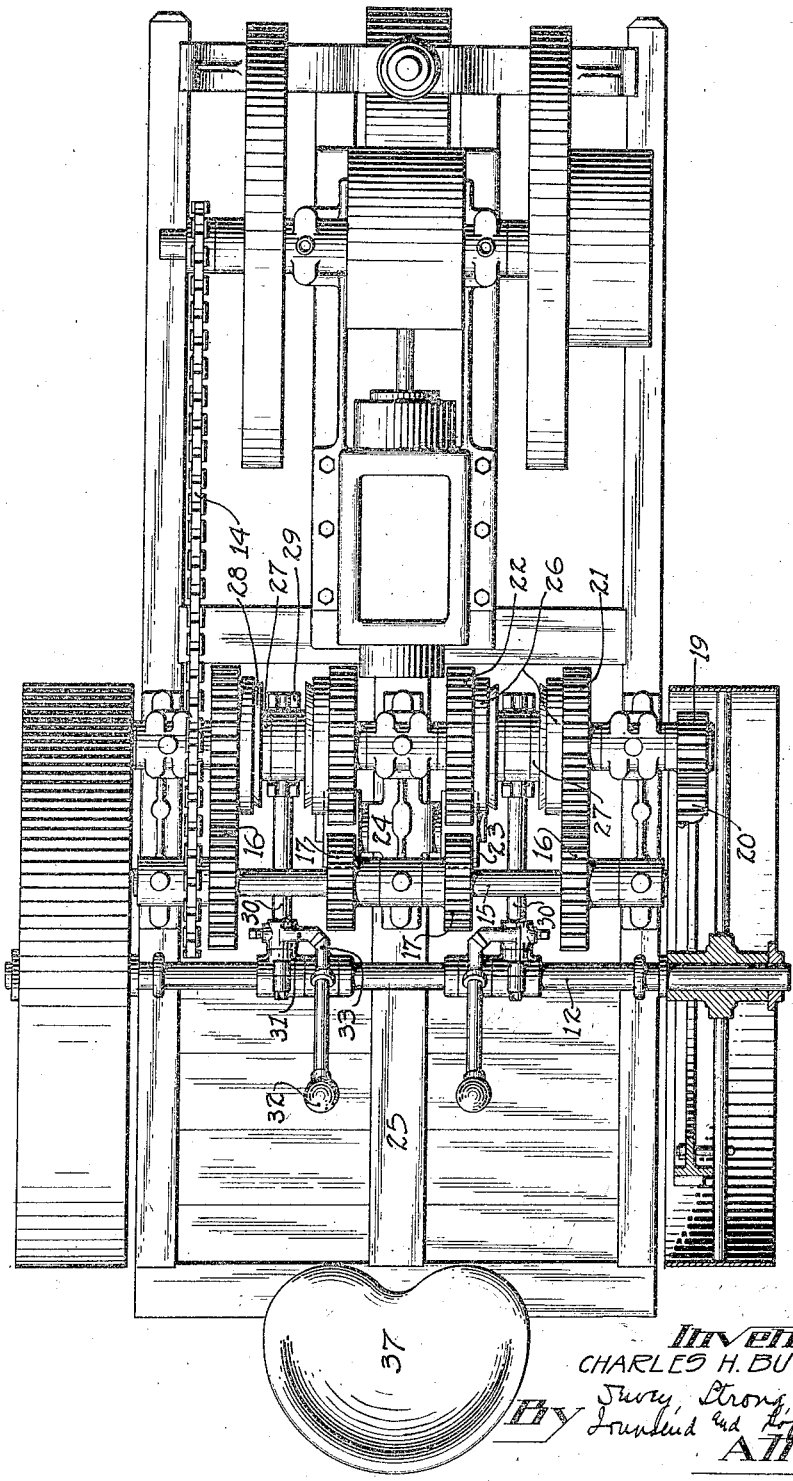
Fig. 2 shows a plan view of the same.
Figure 3:
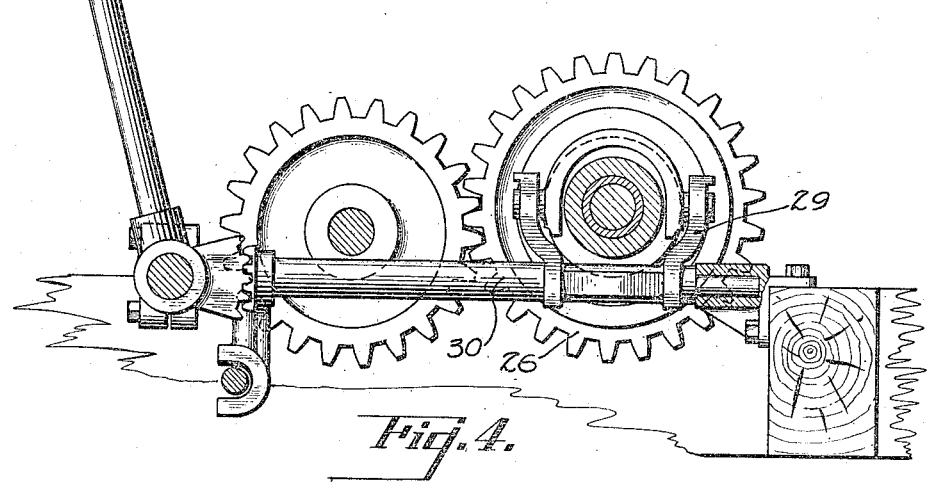
Fig. 3 shows a detail sectional view of one of the forward drive connections and control means therefor.
Figure 4:
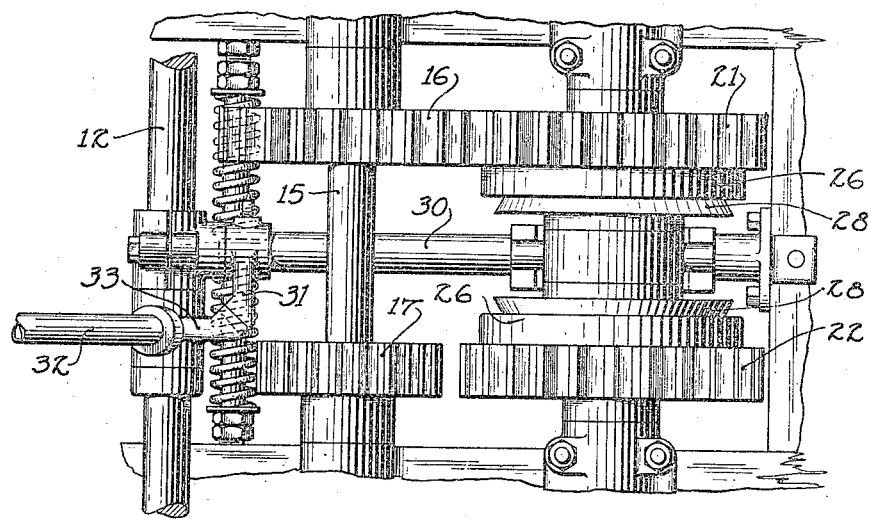
Fig. 4 shows a plan view of the forward and reverse driving connections and control means therefor.
Figure 5:
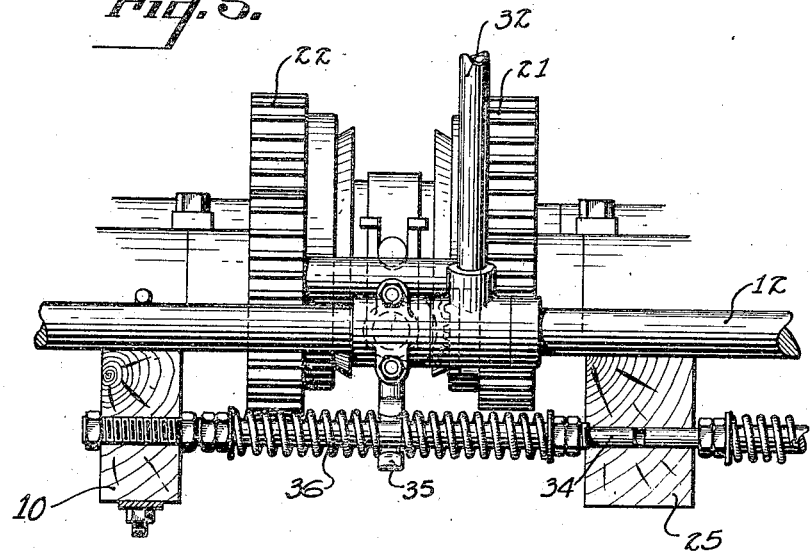
Fig. 5 shows an end elevation of the parts illustrated in Fig. 4.
Figure 6:
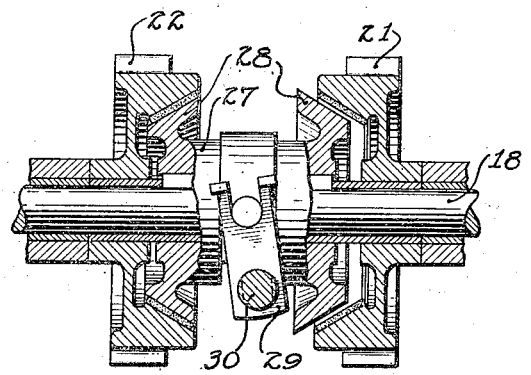
Fig. 6 shows a sectional view through one of the clutch mechanisms.

The tractor herein shown preferably comprises a main frame 10 having a pair of traction wheels 11 at the rear journaled upon an axle 12. A caster wheel 13 is arranged at the forward end of the frame. This frame carries at its forward end a motor having a driving chain 14 extending back to, and connected with, a countershaft 15 which extends transversely of the main frame. This countershaft is fitted near each end with a large spur gear 16 and a smaller spur gear 17.

Parallel with the countershaft is a divided drive shaft 18. The outer end of each part of this shaft is fitted with a driving pinion 19 meshing with an internal gear 20 on the adjacent traction wheel. On each part of the drive shaft is a forward driving spur gear 21 meshing with the spur gear 16 on the countershaft, and a reverse driving gear 22 meshing with an idler pinion 23, which idler pinion in turn meshes with the gear 17 on the countershaft. Both idler pinions are journaled upon a support 24 fixed to a centrally arranged sill member 25 forming a part of the main frame.

Each of the gears 21 and 22 carries a friction clutch member 26 and interposed between these clutch members is a sliding sleeve 27 keyed to the drive shaft and carrying at each end a friction clutch member 28 for co-operation with the clutch member on the adjacent gear. A fork 29 carried by a rock shaft 30 serves to shift this sliding sleeve to bring either one of the co-operating clutch devices into engagement. This rock shaft extends rearwardly to a point adjacent the axle and is fitted with a segmental gear 31 of the bevel type.

Mounted upon the axle is a lever 32 carrying a segmental gear 33 meshing with the gear 31. There is one lever for controlling each clutch-carrying sleeve and these levers are operated independently of each other. Movement of the lever forwardly engages the associated forward driving connections, whereas a rearward movement of the lever causes engagement of the reverse driving connections. When the lever is in a central position, then the connected clutch-carrying element is in neutral position.

A rod 34 fixed to the frame bars extends through a lug 35 depending from the rock shaft 30 and a compressible coil spring 36 wound upon the rod 34 presses against each side of the lug 35, tending thereby to retain the rock shaft 30 in position where the connected clutch-carrying element will be in neutral position. Therefore, when the operator lets go of a control lever, it will immediately return to neutral position. By using friction clutches I can regulate the speed of drive by varying the pressure on the control levers, which is a convenience in steering a tractor of this sort.

The tractor is provided at its rear end with a driver's seat 37.

Having thus described my invention, what I claim and desire to secure by Letters Patent is:

A tractor comprising a main frame, an axle at one end thereof, a castor wheel at the opposite end of the main frame, a motor on the main frame, a countershaft operatively connected by sprockets and chain with the motor, said countershaft extending parallel with the axle, a drive shaft for each traction wheel, said shafts being arranged in longitudinal alignment with each other and in parallelism with the countershaft, a driving pinion fixed at the outer end of each drive shaft, a spur gear fixed on each traction wheel with which gears said driving pinions mesh, a forward drive gear and a reverse drive gear rotatably mounted on each drive shaft, said reverse drive gears being disposed adjacent and at opposite sides of the longitudinal center of the main frame, an idler gear for each reverse gear, said idlers being journaled in bearing on the center sill of the main frame, drive gears fixed on the countershaft in mesh with said idler gears, other driving gears on the countershaft in mesh with the forward drive gears on the drive shafts, clutch elements on the contiguous faces of the forward and the reverse gears of each drive shaft, a sliding sleeve splined on each drive shaft and interposed between the forward and reverse drive gears thereon, clutch elements at each of the ends of said sleeves for cooperation with the clutch elements on the forward and reverse drive gears, independent control means for each of said sliding sleeves, each of said control means comprising a rock shaft having a yoke connected to the sleeve, said rock shaft extending to the axle, a lever on the axle to actuate said rock shaft, means for maintaining said sleeves in neutral positions, said means comprising transverse rods fixed to the main frame, and lugs depending from the rock shafts and engaging said rod, and compressible springs on the rods pressing against the sides of the lugs.

CHARLES H. BUTLER.